United States Patent [19]
Herron

[11] 3,741,194
[45] June 26, 1973

[54] OVEN AND SPACE HEATER APPLIANCE

[75] Inventor: W. S. Herron, Rowland Heights, Calif.

[73] Assignee: Ward & Son, Inc., City of Industry, Calif.

[22] Filed: June 2, 1971

[21] Appl. No.: 149,225

[52] U.S. Cl.................. 126/85 B, 126/21 R, 126/6
[51] Int. Cl................................................ F24c 3/00
[58] Field of Search.............. 126/85 B, 21 R, 21 A, 126/39 C, 214 A, 6

[56] References Cited
UNITED STATES PATENTS
3,358,671  12/1967  Osborne.................................. 126/6
2,634,718  4/1953   Williams............................ 126/21 A FOREIGN PATENTS OR APPLICATIONS
214,671    5/1924   Great Britain..................... 126/85 B
1,241,080  3/1967   Germany......................... 126/21 A Primary Examiner—William F. O'Dea
Assistant Examiner—Harold Joyce
Attorney—White, Haeflinger and Bachand

[57] ABSTRACT

Combination oven and space heater apparatus usable on a trailer or like vehicle comprises: an oven chamber containing a gas burner; multiple passage means providing a first passage for air supply from the trailer exterior to the burner, a second passage for conducting combustion products flowing to the trailer exterior, and a third passage for conducting trailer interior air in heat receiving relation to the oven chamber and then back to the trailer interior; and means to control combustible gas delivery to the oven burner in response to temperature conditions in the oven, thereby to maintain the oven chamber temperature within a predetermined range to control heating of trailer interior air to desired level.

10 Claims, 6 Drawing Figures

PATENTED JUN 26 1973
3,741,194
SHEET 1 OF 2
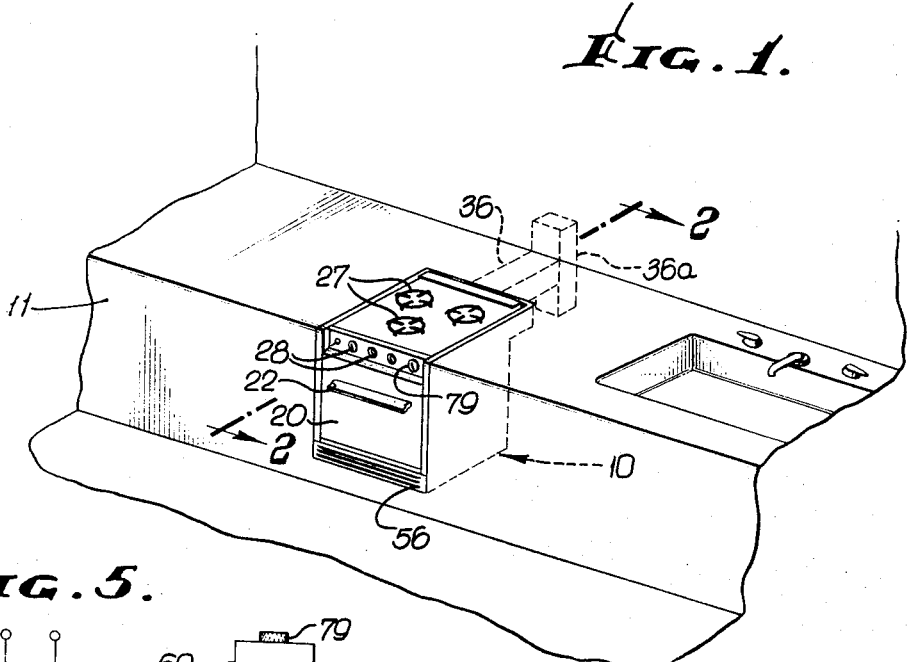
Fig. 1.
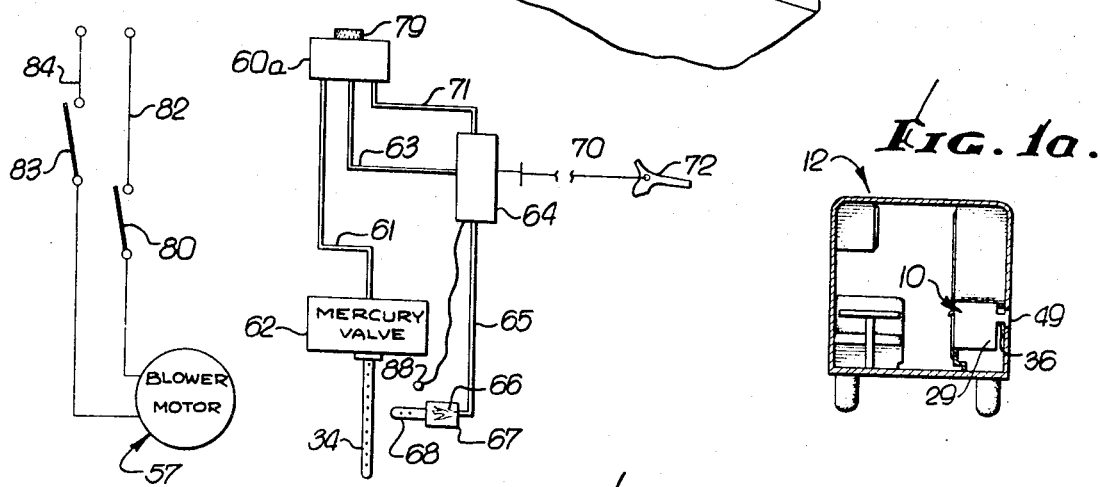
Fig. 5.
Fig. 1a.
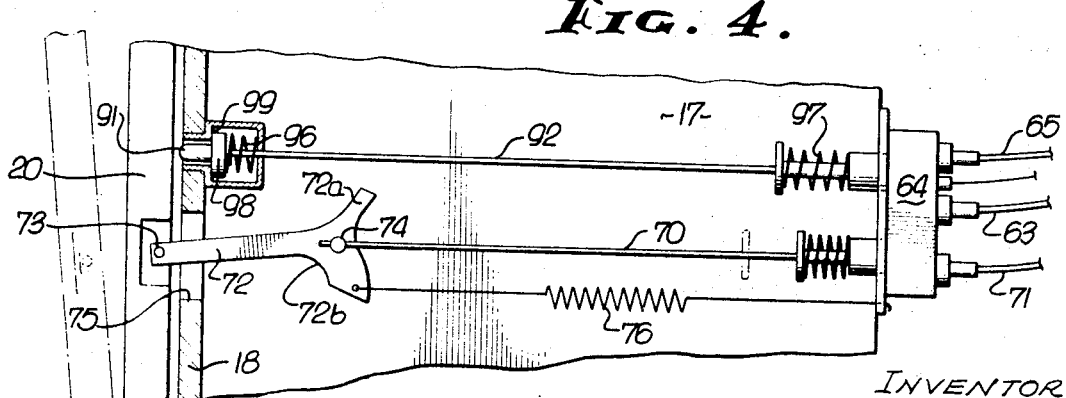
Fig. 4.
INVENTOR.
W. S. HERRON
BY White, Haefliger & Bachand
ATTORNEYS.

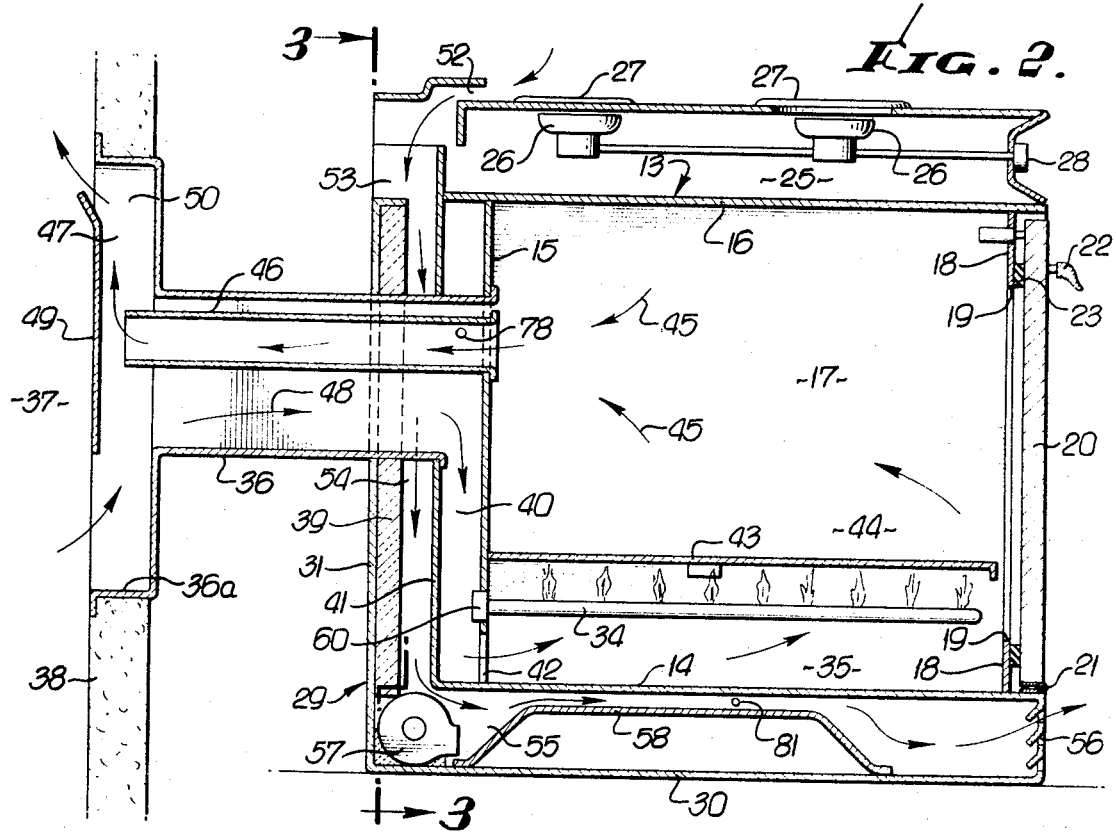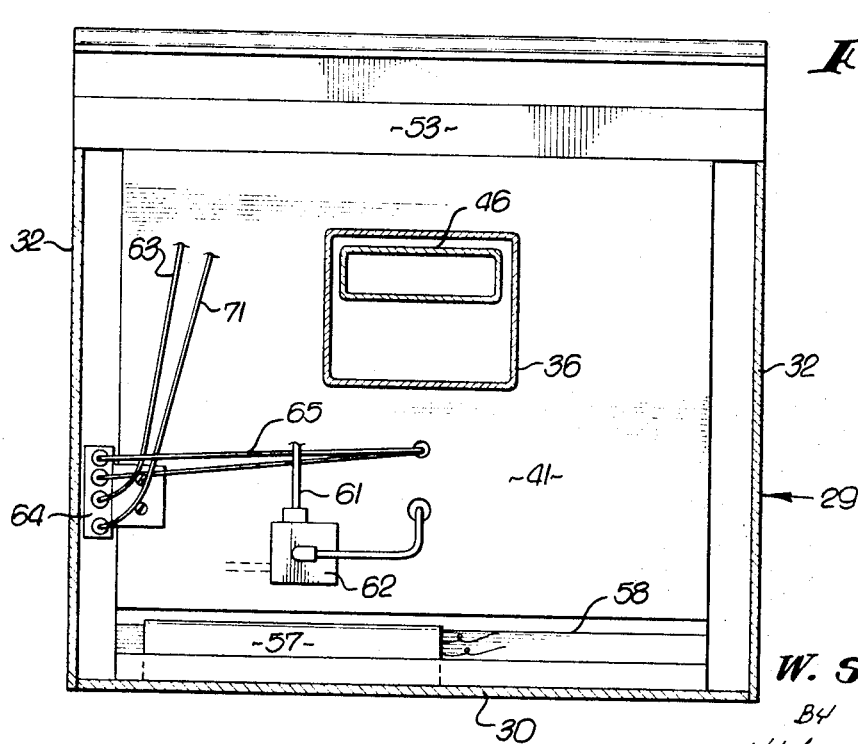

OVEN AND SPACE HEATER APPLIANCE

BACKGROUND OF THE INVENTION

This invention relates generally to space heaters, and more particularly concerns an appliance especially adapted for use in trailers and the like and operable as a trailer interior space heater or as an oven. Reference to "trailers" is made in a very general sense and includes vehicles of all types incorporating cooking ovens.

It is a well known fact that the design and construction of trailers requires the use of compact appliances and other equipment, due to the very limited availability of space. While ovens and space heaters have been incorporated on trailers as separate appliances, no one to my knowledge has combined them in the unusual manner of the present invention to achieve an extreme compactness without sacrifice of flexibility of usage as an oven or a space heater, or both, and with the various safety features as will be disclosed.

SUMMARY OF THE INVENTION

It is a major object of the invention to provide combination oven and space heater apparatus satisfying the requirements of extreme compactness, and with complete safety, enabling usage on a trailer or like vehicle. Basically, the applicance comprises, in combination: an oven chamber containing a gas burner; multiple passage means providing a first passage for air supply from the trailer exterior to the burner, a second passage for conducting combustion products flowing to the trailer exterior, and a third passage for conducting trailer interior air in heat receiving relation to the oven chamber and then back to the trailer interior; and means to control combustible gas delivery to the oven burner in response to temperature conditions in the oven, thereby to maintain the oven chamber temperature within a predetermined range to control heating of trailer interior air to desired level.

It is another object of the invention to provide an improved construction of an appliance operating as described, and wherein the third passage extends downwardly from an entrance and adjacent the rear of the oven chamber to conduct air below the oven chamber for heating and recirculation to the front side of the appliance, whereby an extremely compact design is afforded making possible installation of the unit in the same manner as an oven appliance but with the added space heating functioning. Also, a blower may be located to displace air through the third passage, and a heat reflector panel may be employed in the oven chamber to reflect heat to the bottom of the chamber for efficient transfer to blower displaced air, as will be described.

The control means referred to may include an element operable to energize the blower in response to heating of the oven interior to chosen tempreature, as well as apparatus operable to decrease gas supply to a pilot burner in response to opening of the oven front closure or door, so that trailer interior air is not unduly consumed in supporting pilot burner gas combustion. A master switch may control functioning of the appliance as an oven, or as a space heater, and a range top may be used as desired above the oven.

These and other objects and advantages of the invention, as well as the details of an illustrative embodiment, will be more fully understood from the following description and drawings, in which:

DRAWING DESCRIPTION

FIG. 1 is a perspective showing of an oven unit incorporating the invention, and FIG. 1a shows the unit installed in a trailer seen in vertical cross section;

FIG. 2 is an enlarged vertical section taken on line 2—2 of FIG. 1;

FIG. 3 is a vertical section taken on line 3—3 of FIG. 2;

FIG. 4 is a control diagram; and

FIG. 5 is a control circuit diagram.

DETAILED DESCRIPTION

In FIGS. 1 and 1a the heating appliance of the invention is shown installed at 10 in association with cabinet work 11 as in a trailer or mobile home unit 12.

Extending the description to FIGS. 2 and 3, the appliance 10 is shown to include an oven chamber 13 defined by bottom panel 14, rear panel 15, top panel 16, side panels 17 and front wall 18. The latter defines an opening 19 which is covered by the closure 20 hinged at 21 to be opened and closed as by the handle 22. A seal 23 may be carried by the closure 20 to engage the front wall 18 about the opening 19.

A range top 24 is spaced at 25 above the oven top 16, and suitable heating units 26 may be located in that space beneath the burner grids 27 carried by the range top. Controls for the units 26 are shown at 28.

The oven chamber 13 is enclosed within a housing 29 that includes a bottom wall 30, rear wall 31, and side walls 32, with suitable insulation between the latter and oven chamber walls.

Referring to FIG. 2, a first passage is provided for conducting air to a burner 34 in chamber lower interior 35. That passage may for example, be formed by duct 36 having an enlarged entrance terminal 36a exposed to the trailer exterior 37, whereby air is drawn from the exterior through the trailer wall 38. Duct 36 projects through the housing rear wall 31 and through an insulation layer 39, to communicate with a down passage 40 formed between oven chamber rear wall 15 and a vertical panel 41 as shown. At the lower end of passage 40, air passes forwardly through an opening 42 in wall 15 and into the chamber interior 35 beneath a horizontal metal plate 43. The latter, overlying the burner zone 35, is adapted to be heated by combustion products (which flow upwardly about the plate) and to reflect and radiate heat downwardly to the heat transfer metal panel 14, for purposes as will appear.

A second passage is also provided for conducting hot combustion products flowing from the oven chamber and to an exterior vent. In the example, those combustion products which enter the interior cooking zone 44 flow as indicated by arrows 45 to the horizontal duct 46 mounted on and projecting rearwardly from the oven rear wall 15 through duct 36 and to the vent 47 at the exterior side of trailer wall 38. Accordingly, the cool gases entering the duct 36 as indicated by arrows 48 are warmed in passing inwardly about the metal duct 46, by heat transfer. Vent plate 49 cooperates with the duct exhaust 36a to form a vent passage 50 leading the exhuast products to the exterior.

In accordance with an important aspect of the invention, third passage means is provided for conducting an air stream into heat exchange relation with the oven chamber, but at the exterior thereof, during operation of the burner to heat the oven chamber interior. That passage may, with unusual advantage extend downwardly at 53 and 54 from an entrance 52 at the rear of the range top, and then forwardly at 55 directly beneath the oven chamber bottom plate 14. Passage extent 55 terminates at a louvered exit 56, whereby the air in passage 55 which is heated by transfer from plate 14, is passed into the trailer interior for warming purposes. In this regard, while the air may flow naturally downwardly in passages 53 and 54 and forwardly in passage 55, such flow may be aided by means of a motor driven blower 57 located as shown and operable to displace air forwardly in passage 55, the blower intake receiving air flowing downwardly in passage 54. A baffle 58 in passage 55 deflects the forward air flow into close proximity with the underside of panel 14, for most efficient heat transfer to that air flow. Accordingly, air in the trailer is continuously recirculated in heat receiving relation with the oven without mixing with the combustion products.

Further in accordance with the invention, control means is provided to control combustible gas delivery to the burner, as via pipe 60, in response to temperature conditions in the oven, thereby to maintain the oven interior temperature within a predetermined range to control heat transfer to the air stream in passage 55 for controllably warming the trailer interior. Thus, the oven interior temperature conditions may be utilized to control the heating of the trailer.

In the example of FIG. 5, combustible gas is supplied from an oven control unit 60a, and via a pipe 61 and a safety valve 62 to the main burner 34. Gas is also continuously supplied at a very low rate via line 63 from unit 60a to the pilot safety unit 64 and then via line 65 to provide a small standing flame 66 within the pilot enclosure indicated at 67. At such time, the pilot burner 68 does not produce a pilot flame to light the main burner 34. This condition occurs when the oven door is opened and the pilot safety unit is activated as by pulling of rod 70 to the right in FIG. 5 (to the left in FIG. 4). When the oven door is closed, unit 64 is activated to pass additional gas flow via line 71 to line 65, thereby to effect lighting of pilot burner to light the main burner 34, provided gas is then being supplied from control 60a.

FIG. 4 shows the oven door or closure 20 as connected with rod 70 via a link 72, pivoted to the door at 73 and to the rod at 74. The link extends through an opening 75 in the front wall 18, and surfaces 72a and 72b are engageable with that wall to limit extension of the link relative to the imot 64. Tension spring 76 may be connected between unit 64 and the door to aid in return of the latter to closed position.

A thermostat sensor 78, located in the duct 46 as seen in FIG. 2, is connected to control 60a. When thermostat (or oven temperature) control 79 is turned from OFF position to a selected temperature, gas is admitted to line 61 and passes to the main burner, and combustion takes place via the pilot burner provided the oven door is closed. Upon heating of the oven to the top limit of a range associated with the selected temperature, gas supply to the burner is shut off by control 60a. As the temperature in the oven falls to the lower limit of that range, gas is again supplied to the burner for ignition.

Another switch 80 is closed by a heat sensitive element 81 sensing the temperature just beneath heat transfer plate 14, to electrically connect the blower motor unit 57 with power lead 82. In this regard, main switch 83 must also be closed in return lead 84 for energization to occur. Accordingly, as the oven is heated, the blower is automatically turned on; and, as explained above, the oven burner will cycle on and off to maintain the selected temperature or temperature range in the oven. When switch 83 is turned off, the appliance operates as an oven and not as a space heater; and, when switch 83 is turned on, the oven is operable as a heat source for the space heater, as described.

The valve 62 may comprise a mercury-type safety valve connected in series in the gas line 61 to burner 34, as shown, to prevent back-flashing of the burner.

In FIG. 5, a small capillary valve 88 spaced near the pilot burner is adapted to heat up and thereby effect opening of a valve within unit 64 allowing gas to flow via lines 71 and 65 to the pilot burner, in the event the oven door is closed, as described.

FIG. 4 also shows a manually operable push-button element 91 connected with pilot unit 64 via push rod 92, to effect ignition of the pilot to produce the standing flame. Springs 96 and 97 co-operate to push rod 92 and buttom 91 to the left, and a flange 98 on the rod engages shoulder 99 to limit such leftward urging.

I claim:

1. In a heating appliance, the combination comprising
   a. an oven chamber and a combustible gas main burner extending in the oven chamber lower interior,
   b. first passage means for conducting to the burner air flowing from an exterior intake,
   c. second passage means for conducting hot combustion products flowing to an exterior vent,
   d. third passage means for conducting an air stream into heat receiving relation with the oven chamber but at the exterior thereof during operation of the burner to heat the interior of the oven chamber, the third passage extending downwardly at the side of the first passage means opposite the oven chamber, and then directly beneath the lower interior of the oven chamber to receive downward heat transmission therefrom, and
   e. control means to control combustible gas delivery to the burner in response to temperature conditions in the oven thereby to maintain the oven chamber temperature within a predetermined range to control heat transfer to the air stream in said third passage means.

2. The combination of claim 1 wherein said burner is in the oven chamber and said third passage means has an entrance at a level above the upper interior level of the oven chamber, and an exit at a level below the lower interior level of the oven chamber.

3. The combination of claim 1 wherein said burner is in the oven chamber and said third passage means extends downwardly adjacent the rear of the oven chamber and then forwardly beneath the oven chamber to conduct air to the front side of the oven.

4. The combination of claim 1 including a blower positioned to displace air downwardly and then forwardly in said third passage means, said oven chamber including a panel separating the oven interior from air flowing forwardly in said third passage, said burner extending openly in the oven chamber and proximate said panel.

5. In a heating appliance, the combination comprising
   a. an oven chamber and a combustible gas main burner extending in heating relation therewith,
   b. first passage means for conducting to the burner air flowing from an exterior intake,
   c. second passage means for conducting hot combustion products flowing to an exterior vent,
   d. third passage means for conducting an air stream into heat receiving relation with the oven chamber but at the exterior thereof during operation of the burner to heat the interior of the oven chamber,
   e. control means to control combustible gas delivery to the burner in response to temperature conditions in the oven thereby to maintain the oven chamber temperature within a predetermined range to control heat transfer to the air stream in said third passage means,
   f. a blower positioned to displace air downwardly and then forwardly in said third passage means, said oven chamber including a panel separating the oven interior from air flowing forwardly in said third passage, said burner extending openly in the oven chamber and proximate said panel, and
   g. the oven chamber containing a heat reflector located to reflect burner produced heat downwardly to said panel.

6. The combination of claim 4 wherein said control means includes an element operable to energize said blower in response to heating of the oven interior to a temperature within said range.

7. In a heating appliance, the combination comprising
   a. an oven chamber and a combustible gas main burner extending in heating relation therewith, the chamber including a closure,
   b. first passage means for conducting to the burner air flowing from an exterior intake,
   c. second passage means for conducting hot combustion products flowing to an exterior vent,
   d. third passage means for conducting an air stream into heat receiving relation with the oven chamber but at the exterior thereof during operation of the burner to heat the interior of the oven chamber, and
   e. control means to control combustible gas delivery to the burner in response to temperature conditions in the oven thereby to maintain the oven chamber temperature within a predetermined range to control heat transfer to the air stream in said third passage means,
   f. a blower positioned to displace air downwardly and then forwardly in said third passage means, said oven chamber including a panel separating the oven interior from air flowing forwardly in said third passage, said burner extending openly in the oven chamber and proximate said panel, and
   g. there being a pilot burner and said control means including apparatus operable to effect decrease of gas supply to the pilot burner in response to opening of said closure.

8. The combination of claim 7 wherein said pilot burner is proximate the main burner and said apparatus includes a control unit operating connected with the closure to decrease the supply of gas to the pilot burner when the closure is open.

9. The combination of claim 6 including a range top extending over said oven and range burner means located at said top, there being a master switch connected in controlling relation with the blower, the switch having one position in which the blower is disabled, and another position in which operation of the blower is enabled, for control by said element.

10. In a heating appliance, the combination comprising
   a. an oven chamber and a combustible gas main burner extending in heating relation therewith,
   b. a first duct forming first passage means for conducting to the burner air flowing from an exterior intake,
   c. a second duct forming second passage means for conducting hot combustion products flowing to an exterior vent,
   d. third passage means for conducting an air stream into heat receiving relation with the oven chamber but at the exterior thereof during operation of the burner to heat the interior of the oven chamber, and
   e. control means to control combustible gas delivery to the burner in response to temperature conditions in the oven thereby to maintain the oven chamber temperature within a predetermined range to control heat transfer to the air stream in said third passage means, and
   f. the first duct projecting between the intake and the oven chamber, and the second duct extending in telescoping relation with said first

* * * * *